United States Patent
Aguilar

(10) Patent No.: US 9,284,011 B2
(45) Date of Patent: Mar. 15, 2016

(54) LINKED DUAL ACTION MOTORCYCLE CLUTCH ACTUATOR

(71) Applicant: Fernando Aguilar, Albuquerque, NM (US)

(72) Inventor: Fernando Aguilar, Albuquerque, NM (US)

(73) Assignee: Fernando Aguilar, Albuquerque, NM (US)

( * ) Notice: Subject to any disclaimer, the term of this patent is extended or adjusted under 35 U.S.C. 154(b) by 39 days.

(21) Appl. No.: 14/248,281

(22) Filed: Apr. 8, 2014

(65) Prior Publication Data

US 2015/0284046 A1  Oct. 8, 2015

(51) Int. Cl.
*B62K 23/06* (2006.01)
*B62K 23/08* (2006.01)
*F16D 23/12* (2006.01)

(52) U.S. Cl.
CPC .............. *B62K 23/06* (2013.01); *B62K 23/08* (2013.01); *F16D 23/12* (2013.01)

(58) Field of Classification Search
None
See application file for complete search history.

(56) References Cited

U.S. PATENT DOCUMENTS

| | | | | |
|---|---|---|---|---|
| 2,094,163 A | * | 9/1937 | Weber | B62M 25/04 74/473.16 |
| 2,540,926 A | * | 2/1951 | Zook | B62M 25/04 192/3.51 |
| 4,316,531 A | * | 2/1982 | Harpster | B62K 23/06 192/114 R |
| 5,299,652 A | * | 4/1994 | Bevins | B60T 8/261 180/219 |
| 5,662,195 A | * | 9/1997 | Rush | B62K 11/14 180/230 |
| 6,945,376 B1 | * | 9/2005 | Hunter | B62K 23/08 192/114 R |

FOREIGN PATENT DOCUMENTS

GB  168726  *  9/1921
WO  WO 2005/100143 A1  *  10/2005

* cited by examiner

*Primary Examiner* — Rodney H Bonck

(57) ABSTRACT

Disclosed is a motorcycle clutch actuator, with mechanically linked foot clutch pedal and hand clutch lever, to be installed on motorcycles made with or to be converted from a conventional configuration of hand activated clutch and foot activated gear selection lever, to a configuration of foot activated clutch and hand activated gear selection lever, providing optimal clutch control with either a foot clutch pedal or a hand clutch lever, by means of innovative control linkage geometry and minimization of friction throughout the control linkage, releasing the rider's left foot from the foot clutch pedal, while holding the clutch in the disengaged position with a hand clutch lever, as the motorcycle is running while in gear, thereby enabling the rider to balance the motorcycle with both feet. The disclosed invention will improve safety in the operation of motorcycles equipped with a hand gear selection lever and a foot clutch pedal.

7 Claims, 9 Drawing Sheets

LINKED DUAL ACTION MOTORCYCLE CLUTCH ACTUATOR

BACKGROUND OF THE INVENTION

1. Field of the Invention

The present invention relates to a motorcycle clutch with linked foot and hand clutch actuators that enables foot or hand activation of a motorcycle clutch for installation on motorcycles that may use or have been retrofitted from a configuration of a hand activated clutch and foot activated gear selection lever, to a configuration of a foot activated clutch and hand activated gear selection lever. It employs coupled foot and hand mechanical linkages that eliminate impediments to precise and predictable clutch operation and imparts a high degree of safety in the operation of a motorcycle by allowing the clutch to be held in the disengaged position with either the left foot or left hand with the motorcycle running while in gear.

2. Description of the Prior Art

Contemporary motorcycles are generally equipped with mechanical clutches as part of the drive train, which provide the interface between the motor output shaft and the transmission. These clutches are activated by pulling a hand lever on the left handlebar, which in turn drives a cable that is attached to the clutch. Later motorcycles may also be equipped with a hydraulic link between the hand lever and the clutch. Gear selection on contemporary motorcycles is accomplished by the up and down movement of a foot pedal on the left side of the motorcycle. However, as late as the mid-1950s, vintage motorcycles were equipped with foot operated clutches and gear selection levers that were operated by hand. Such motorcycles include early Harley-Davidson™, Moto Guzzi™, Excelsior-Henderson™, BMW™ and Indian™ ™ motorcycles, in addition to many others.

Today the motorcycle world is trending to an appreciation of the form and function of vintage motorcycles. Motorcycle enthusiasts are increasingly attracted to "cruiser" class motorcycles that emulate the look of older motorcycles. To more closely mimic the vintage look, contemporary motorcyclists find themselves retrofitting their motorcycles with "aftermarket" foot clutches as well as gear selection levers that are actuated by hand.

Current aftermarket foot clutch actuators, for retrofitting of contemporary motorcycles, provide a link from a foot clutch pedal, generally on the left side of the motorcycle, via a cable within a flexible cable housing that is sharply arced to the side of the motorcycle where the cable connects with the clutch mechanism. The location to which the cable connects with the original equipment manufacturer clutch mechanism is generally behind the motor, on the right side of the motorcycle. When the foot pedal is activated, the cable transmits the force to the original equipment manufacturer motorcycle clutch, thereby allowing the motorcycle operator to change gears with the hand operated gear change lever.

However this configuration causes imprecise and rough clutch engagement because of flawed geometric relationships between the foot pedal and the insufficient arc of travel of the foot clutch pedal over the small displacement imparted to the clutch cable. This results in frequent stalls and erratic starts which may pose a safety issue.

In addition, since the position of the motorcycle clutch mechanism and transmission is behind the motor, this places the foot actuated clutch lever in front of and far removed from the clutch mechanism. Current aftermarket foot clutch actuators produce tremendous friction between the cable and cable housing over a sharp bend of up to 180 degrees. This results sluggish clutch engagement and lack of engagement feedback, further exacerbating accurate clutch actuation which results in frequent stalls and erratic starts.

Current aftermarket foot clutch actuators do not provide a means of holding the clutch in a disengaged position to allow both of the operator's feet on the ground to balance the motorcycle when stopped with the motor idling while still in gear.

Current aftermarket foot clutch actuators also do not provide a coupled hand clutch option for re-engaging the clutch from a stationary position.

Current aftermarket foot clutch actuators also do not provide a coupled hand clutch option for modulating the clutch during precision slow speed operations when both feet must be available for balancing the motorcycle.

Current aftermarket foot clutch actuators also do not provide a coupled hand clutch option for accomplishing an emergency stop, with motor running and the transmission in gear, thus allowing both feet to be free for balancing the motorcycle.

Current aftermarket foot clutch actuators do not provide a means of eliminating friction between a contorted control cable and cable housing, resulting in erratic clutch operation and vague clutch engagement feedback, which induce frequent stalls and erratic starts.

Current aftermarket foot clutch actuators do not provide the means of augmenting the original equipment manufacturer clutch spring(s) within the motorcycle clutch assembly, to return the foot clutch pedal to the engaged position.

Current aftermarket foot clutch actuators do not provide a means, such as a cam, to progressively reduce the rate of displacement of the control linkage while the clutch is being engaged, to enable more precise operation of the clutch.

Current aftermarket foot clutch actuators do not provide the means of transferring the force originating from the foot clutch pedal or the hand clutch lever from one elevation to another for the purpose of routing cables in the control linkage by straightest route to the original equipment manufacturer clutch assembly, thereby eliminating detrimental friction from contorted control cable housings which results in frequent stalls and erratic starts.

During an emergency scenario in which the motorcycle operator must abruptly stop and balance the motorcycle with both feet on the ground, he or she will not have time to find the neutral position on the transmission and will need to hold the clutch in the disengaged position while bringing the motorcycle to a complete stop. This action allows the engine to idle while still in gear. Conventional motorcycles with the modern foot gear shift, hand clutch configurations allow for emergency stops while the motorcycle is in gear and both feet are required on the ground after stopping, by the operator applying simultaneous positive pressure on the left hand clutch lever, right hand front brake lever and right foot rear brake lever. Before the motorcycle comes to a complete stop the motorcycle operator will have free use of both feet to balance the motorcycle while the clutch is held in the in the disengaged position with the left hand and the motorcycle is maintained motionless by means of the front hand brake while the motorcycle is idling and in gear.

During a routine planned stop, the motorcycle operator riding a modern motorcycle retrofitted with an aftermarket foot clutch actuator may have the presence of mind to find the neutral position on the transmission before stopping, allowing him or her to release the foot clutch and place both feet on the ground to balance the stopped motorcycle and maintain it in the motionless state by means of the front hand brake.

However in an emergency situation involving a modern motorcycle retrofitted with an existing aftermarket foot clutch actuator, wherein the operator must accomplish an abrupt stop with the motorcycle in gear, the operator would not be able to hold the clutch in the disengaged position with the left foot when both feet must be available for balancing the motorcycle. This scenario can result in either a total inability of the rider to stop the motorcycle altogether, or a much longer stopping distance since the motorcycle brakes would be working against the still engaged motor, or a stalled motorcycle. Either result endangers the motorcycle operator and rider as well as pedestrians and the motoring public.

U.S. Pat. No. 5,662,195 A (Shifter assembly conversion kit) describes a gear shift conversion kit and method for converting a foot-operated shift mechanism and a hand-operated clutch mechanism on a motorcycle to a hand-operated shift mechanism and a foot-operated clutch mechanism. The clutch actuation mechanism described in U.S. Pat. No. 5,662, 195 A is limited to clutch actuation via foot control only and does not provide for dual clutch actuation capability via foot pedal and hand lever. Generally, this type of aftermarket clutch actuator imparts tremendous friction between the cable and cable housing resulting in lack of engagement feedback, further exacerbating inaccurate clutch actuation resulting in frequent stalls and erratic starts. In addition, this type of foot clutch configuration is limited by the small displacement of the arc of travel of the foot clutch pedal, preventing precise and smooth clutch re-engagement. This results in frequent stalls and erratic starts.

U.S. Pat. No. 4,316,531 A (Clutch lockout latch) is a manually operated latch mounted on the handlebar of a motorcycle to engage the hand clutch control lever for holding the clutch in a locked-out position or in a partially disengaged position. This invention allows for the motorcycle operator to put the hand operated clutch in the disengaged position without having to maintain positive pressure on hand clutch lever. The invention described in U.S. Pat. No. 4,316,531 is limited to clutch actuation via hand control only and does not provide for dual clutch actuation capability via foot pedal and hand lever. In addition this invention would not allow the rider to use a hand operated gear selection lever.

U.S. Pat. No. 2,540,926 A (Conversion unit for motorcycles) relates to an attachment for vintage (1940s & earlier) motorcycles to convert them from the foot clutch, hand gear shift configuration to hand clutch, foot gear shift configuration. This invention is the direct antithesis of what the present patent means to accomplish. In addition the invention described in U.S. Pat. No. 2,540,926 A is limited to clutch actuation via hand control only and does not provide for dual clutch actuation capability via foot pedal and hand lever. Furthermore, this invention eliminates the use of a hand operated gear selection lever.

U.S. Pat. No. 2,094,163 A (Gear controlling means for motorcycles) provides for coupled hand and foot controls for the gear selection on a motorcycle. Clutch actuation is accomplished with a hand lever on the handlebar. The invention described in U.S. Pat. No. 2,094,163 A is limited to clutch actuation via hand control only and does not provide for dual clutch actuation capability via foot pedal and hand lever.

U.S. Pat. No. 5,299,652 A (Motorcycle controls for physically challenged rider) relates to a handlebar control system for a motorcycle which enables complete control of the motorcycle without moving the hands from the handlebars. The invention described in U.S. Pat. No. 5,299,652 A does not provide for a foot operated clutch.

Patent number WO 2005100143 A1 (Motorcycle gear shift control) provides for a foot operated gear-shift assembly, gear shift conversion kit, and method for changing gear shifting actions of a conventional motorcycle wherein the heel and toe shift elements of the conventional rocker-arm gear shift assembly are separated and rotate about separate pivot axes. The invention described in patent number WO 2005100143 A1 simply alters the foot shift mechanism, and gear selection is still accomplished via foot control. This precludes the use of a foot operated clutch. In addition this invention does not provide for a hand operated gear selection lever.

U.S. Pat. No. 6,945,376 B1 (Foot Operated Motorcycle Clutch) is a foot-operated clutch mechanism to be installed on modern motorcycles to convert them from hand operated clutch to foot operated clutch. This mechanism is limited to clutch actuation via a foot pedal only and does not provide for dual clutch actuation capability via foot pedal and hand lever.

The custom motorcycle aftermarket also includes a hand operated gear selector lever with the hand operated clutch lever mounted to the gear selection lever. This configuration of hand clutch mounted on hand gear selection lever can be seen advertised in magazines, which cater to the custom motorcycle builder, such as "American Iron" and "Chopper". This configuration requires the rider to initiate forward motion of a stationary motorcycle by engaging the clutch with the left hand away from the handlebar and only the right hand controlling the direction of the motorcycle. This embodiment makes it impossible to safely maneuver the motorcycle in very slow speed situations that require both feet on the ground and both hands on the handlebars while modulating the clutch. In addition this embodiment is limited to clutch actuation via hand control only and does not provide for dual clutch actuation capability via foot pedal and hand lever.

SUMMARY OF THE INVENTION

The present invention is a motorcycle clutch actuator that mechanically links foot and hand clutch actuators that enable foot or hand activation of a motorcycle clutch for installation on motorcycles that may use, or have been retrofitted from a conventional modern day configuration of a hand activated clutch and foot activated gear selection lever, to an altered configuration of hand operated gear selection lever and a foot activated clutch.

The present invention may also be installed as original equipment on a modern motorcycle or used to retrofit an existing modern motorcycle. The device has structure that allows the rider to hold the clutch in the disengaged position with either a foot clutch pedal or a hand clutch lever by employing coupled mechanical linkages between the foot clutch pedal and the hand clutch lever. This structure also allows the rider to engage the clutch through the release of positive pressure from a foot clutch pedal or a hand clutch lever. The present invention employs coupled foot and hand mechanical linkages of such geometry so as to eliminate impediments to precise and predictable clutch operation and imparts a high degree of safety in the operation of such a retrofitted motorcycle by allowing the clutch to be held in the disengaged position with either the left foot or the left hand, allowing the motor to idle while in gear.

It is therefore a primary object of the present invention, to provide the means for a rider of a motorcycle retrofitted with a hand gear selection lever and a foot actuated clutch pedal to hold the clutch in the disengaged condition with the hand clutch lever, that is linked to the foot clutch pedal, thus allowing the rider to remove his or her left foot from the foot clutch pedal to balance the motorcycle with both feet on the ground while the stationary motorcycle is still in gear and idling.

It is another object of the present invention to enable the rider of a motorcycle retrofitted with a hand gear selection lever and a foot actuated clutch to exercise precise and predictable clutch engagement through improved control linkage geometry.

It is a further object of the present invention to enable the rider of a motorcycle retrofitted with a hand gear selection lever and a foot actuated clutch, to sense accurate mechanical feedback during clutch operation by eliminating detrimental friction between the clutch control cable and the cable housing as well as any other element of the control linkage.

It is still another object of the present invention to enable the rider of a motorcycle retrofitted with a hand gear selection lever and a foot actuated clutch, to safely maneuver the motorcycle during very slow speed operations that require both feet on the ground for "walking" the motorcycle, and both hands on the handlebars, while precisely modulating the clutch with the hand clutch lever.

It is still a further object of the present invention to enable the rider of a motorcycle retrofitted with a hand gear selection lever and a foot actuated clutch, to enable the rider to engage the clutch with a hand lever for the purpose of initiating forward motion of the motorcycle from a stationary position while releasing both feet to be on the ground for balancing the motorcycle.

It is still an even further object of the present invention to enable the rider of a motorcycle retrofitted with a hand gear selection lever and a foot actuated clutch, to accomplish a sudden emergency stop, which would require both feet on the ground, with the transmission in gear and the motor idling.

These and other objects of the present invention will become apparent to those skilled in this art upon reading the accompanying description, drawings, and claims set forth herein. The headings provided herein are for the convenience of the reader only. No headings should be construed to limiting upon the content in any way. The invention summarized above comprises the constructions hereinafter described, the scope of the invention being indicated by the subjoined claims.

DETAILED DESCRIPTION OF THE INVENTION

1. Definitions According to the Present Invention

Structural plates: Two structural plates with high rigidity provide the structure with which to attach the invention to the motorcycle and align all the components of the present invention. Specific to the present invention the horizontal plate is attached to the vertical plate which in turn is attached to the motorcycle frame thereby providing the structure on which to mount other elements of the invention.

Control cable: Specific to the present invention, a control cable is used to transmit a pulling force by the displacement of an inner cable relative to the hollow outer cable housing which is a fixed member.

Control cable housing stop: Specific to the present invention, a control cable housing stop holds and positions the cable housing in the appropriate location and orientation and enables displacement of the cable in reference to the cable housing.

Foot clutch pedal shaft: Specific to the present invention, the foot clutch pedal shaft serves for transmitting torque and rotational motion from foot clutch pedal to the 180 degree bell crank.

Foot clutch pedal shaft housing: Specific to the present invention, the foot clutch pedal shaft housing is integral with the vertical support plate and acts as a cylindrical bearing, of slightly larger diameter than that of the foot clutch pedal shaft, to support and orient the rotating cylindrical shaft.

Bell crank: Specific to the present invention, a bell crank is a device that converts the rotary force of the rotating foot clutch pedal shaft to linear motion of the control linkages. Bell cranks of 180 degrees and 90 degrees are depicted in various embodiments of the present invention.

Torsion spring: Specific to the present invention, the torsion spring is a flexible metal wire in the shape of a coil that twists about the axis of the foot clutch pedal shaft when subjected to the rotary force imparted by the rotating shaft, and that exerts a force in the opposite direction of motion of the shaft, with the force increasing as the angle of twist increases. For the purposes of this invention, the torsion spring augments the force imparted by the clutch spring(s) within the original equipment manufacturer's motorcycle clutch assembly, to return the foot clutch pedal to the engaged position.

Cam: Specific to the present invention, the cam is an eccentric portion of the lower part of the 180 degree bell crank that changes the rate of displacement of the control linkage. For the purpose of this invention, the cam progressively reduces the rate displacement of the control linkage, as the bell crank is rotated and the clutch approaches the engaged position.

Figure 1:
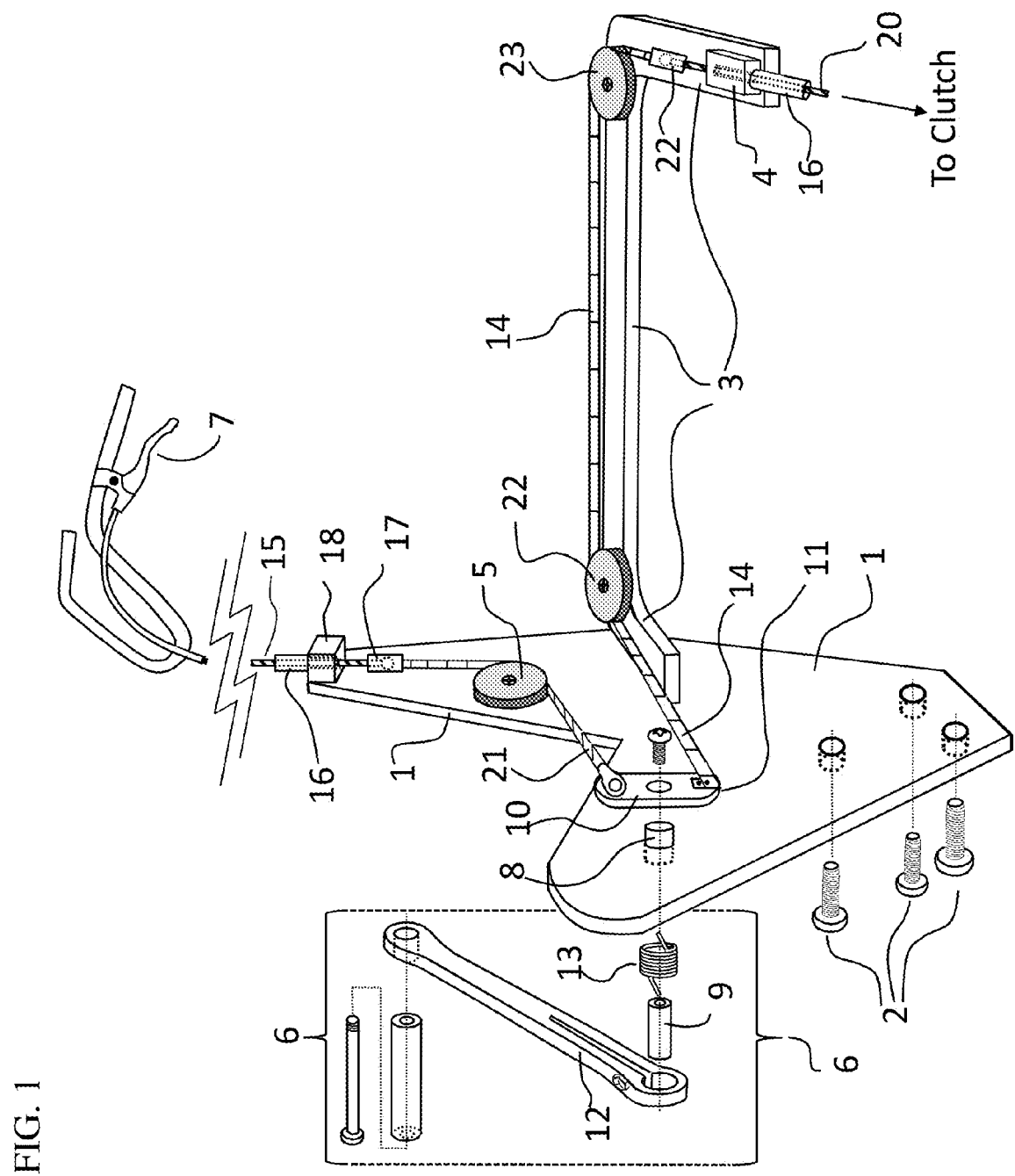
FIG. 1 is a three dimensional view of the invention viewed from behind and to the right according to the present invention.
Figure 2:
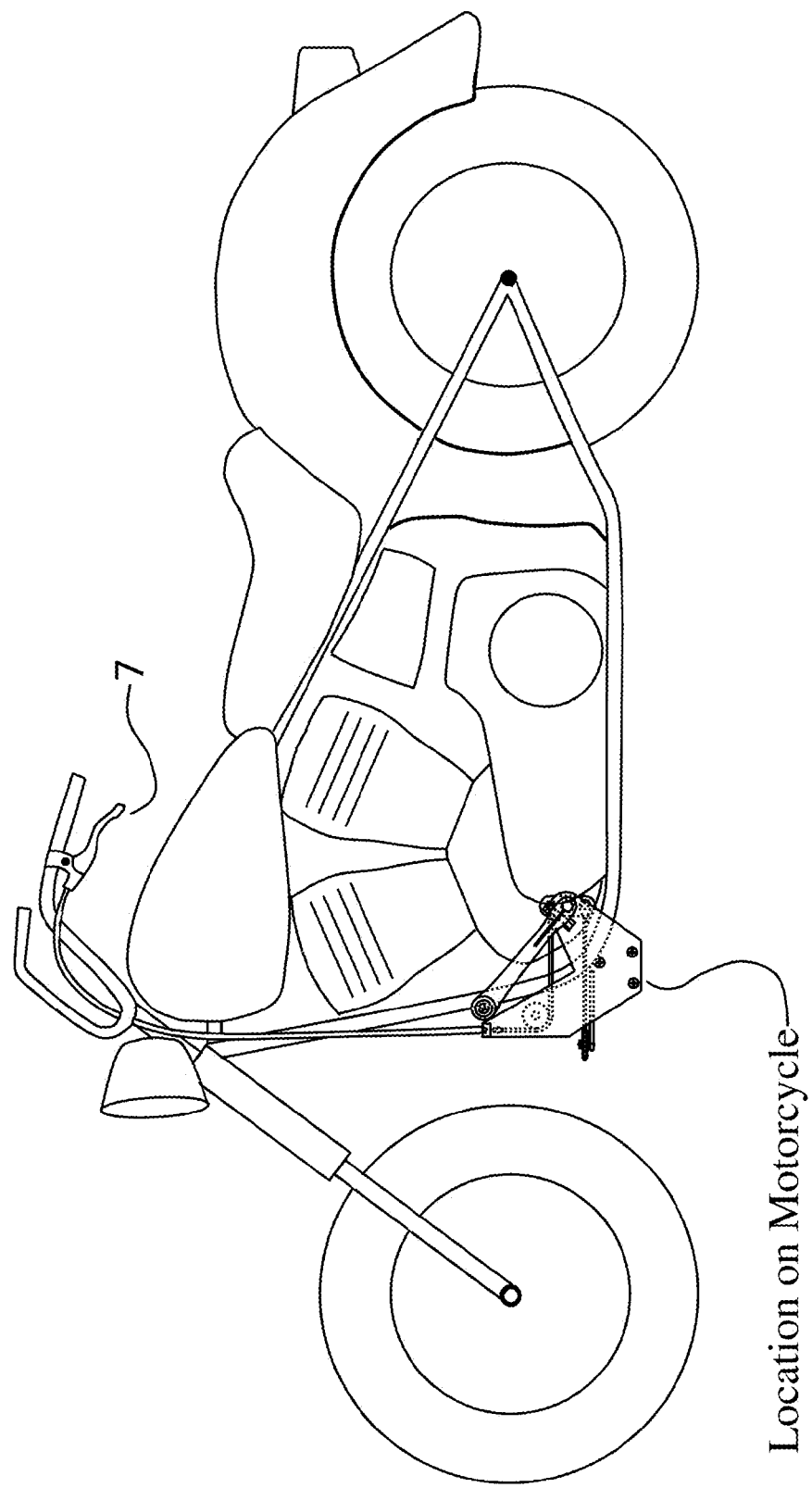
FIG. 2 is a left side view of a motorcycle indicating the location on the motorcycle of the invention according to the present invention.

Chain and sprocket control linkage system [FIG. 1, 3, 4]: Specific to the present invention, a chain and sprocket system of two or more sprockets 5, 22, 23 in conjunction with the chains 14, 21, allows the force originating from the foot clutch pedal 6 or the hand clutch lever 7 to be transmitted around the sprockets 5, 22, 23 for the purpose of redirecting the force to the appropriate area of the motorcycle for effective displacement of the final element in the clutch actuation system.

Belt and pulley control linkage system [FIG. 1, 3, 4]: In another embodiment of the present invention, the chain and sprocket control linkage system may be substituted by a belt and pulley system of two or more pulleys 5, 22, 23 in conjunction with the belts 14, 21 which enables the force originating from the foot clutch pedal 6 or the hand clutch lever 7 to be transmitted around the pulleys 5, 22, 23 for the purpose of redirecting the force to the appropriate area of the motorcycle for effective displacement of the final element in the clutch actuation system.

Figure 6:
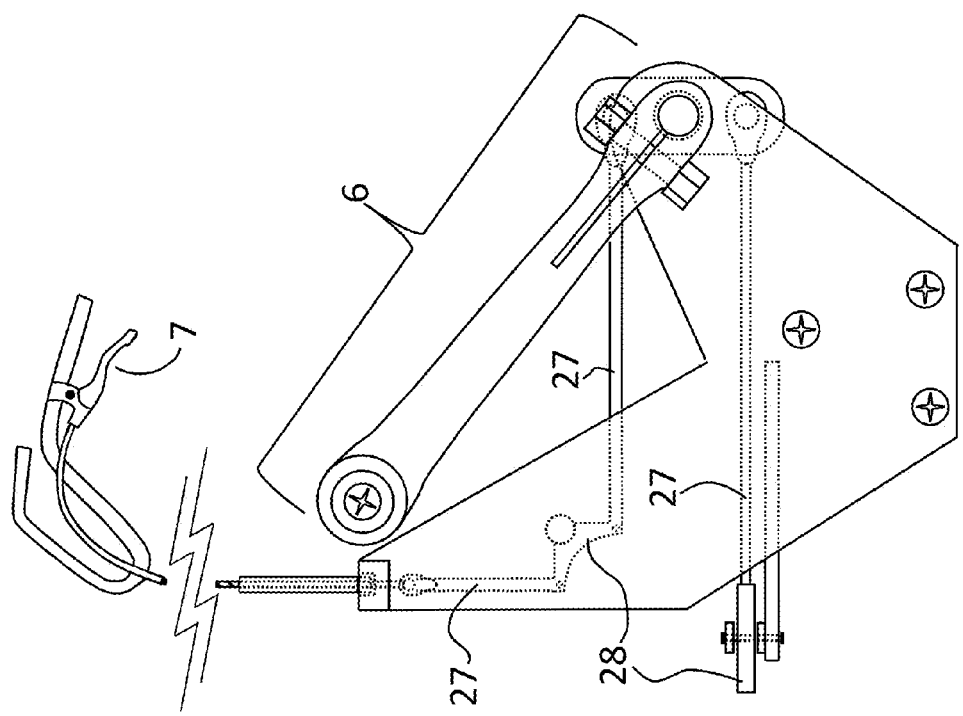
FIG. 6 is a left side view of yet another embodiment of the invention in which an arraignment of bell cranks and control rods enable direction changes and transference of force from of the foot clutch pedal or the hand clutch lever to the final control linkage elements of the present invention according to the present invention.
Figure 7:
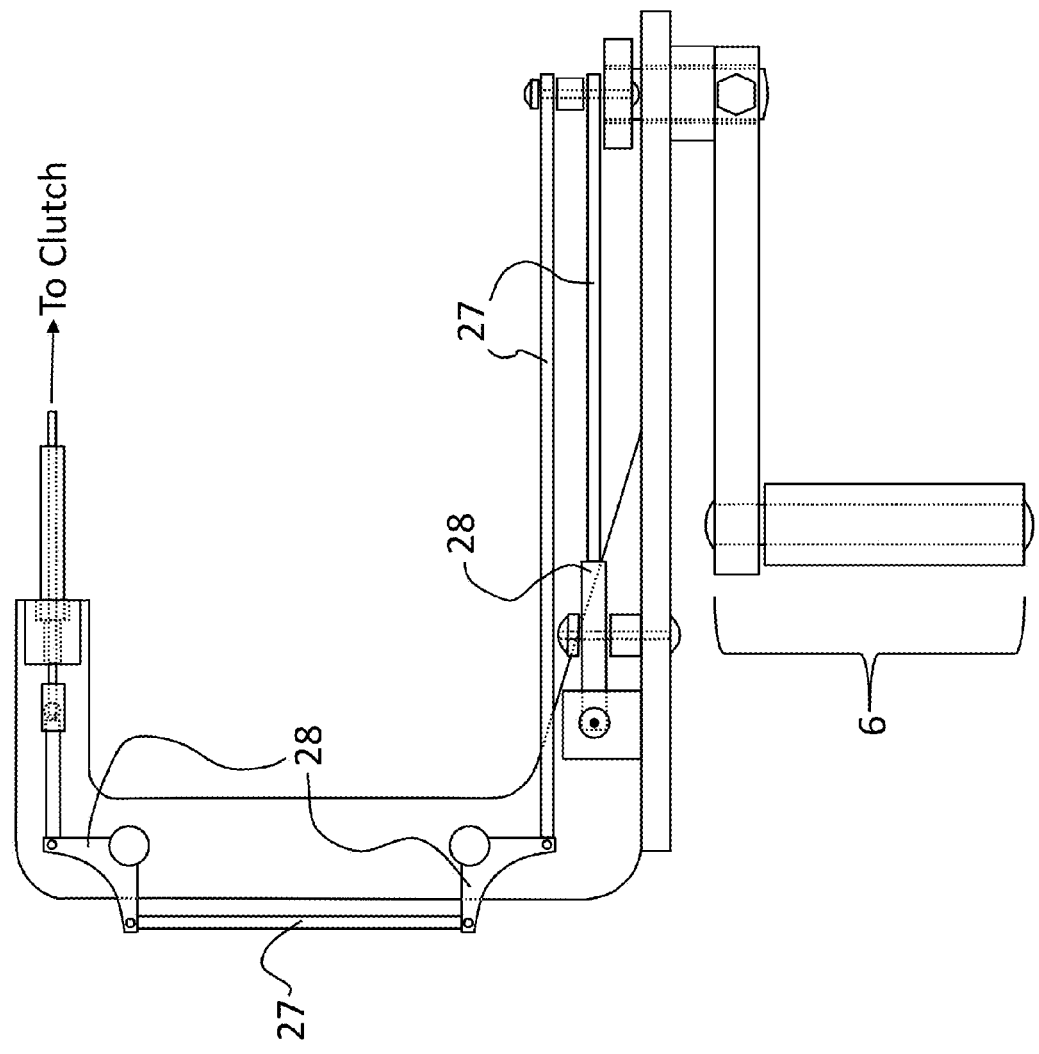
FIG. 7 is a top view of the embodiment of the invention described in FIG. 6 according to the present invention.

Bell crank and control rod linkage system [FIG. 6, FIG. 7]: In another embodiment of the present invention, a bell crank and control rod system of two or more bell cranks 28, in conjunction with the appropriate number of control rods 27, allows the force originating from the foot clutch pedal 6 or the hand clutch lever 7 to be transmitted via the particular angle of the bell cranks 28 for the purpose of redirecting the force to the appropriate area of the motorcycle for effective displacement of the final element in the clutch system.

Control rod: For the bell crank and control rod linkage embodiment of the present invention, a control rod 27 is a rigid cylindrical shaft that transmits the force from the bell cranks 28 to other elements of the clutch linkage.

Figure 8:
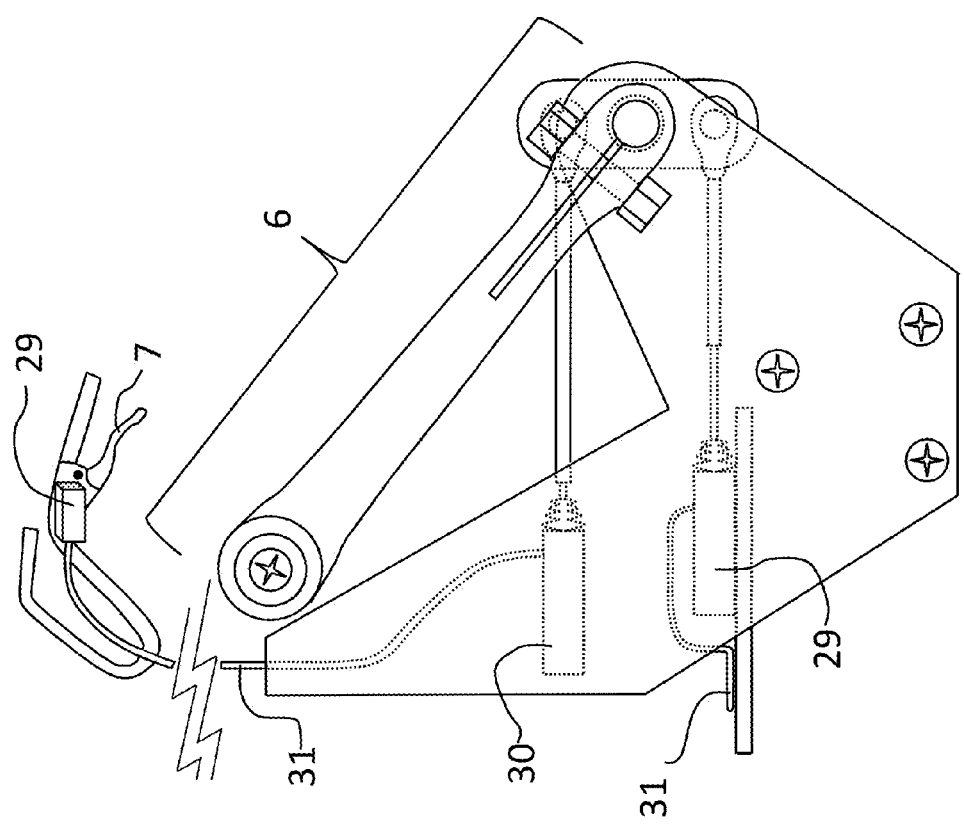
FIG. 8 is a left side view of even yet another embodiment of the invention in which an arraignment of hydraulic actuators enables direction changes and transference of force from the foot clutch pedal or the hand clutch lever to the final control linkage elements of the present invention
Figure 9:
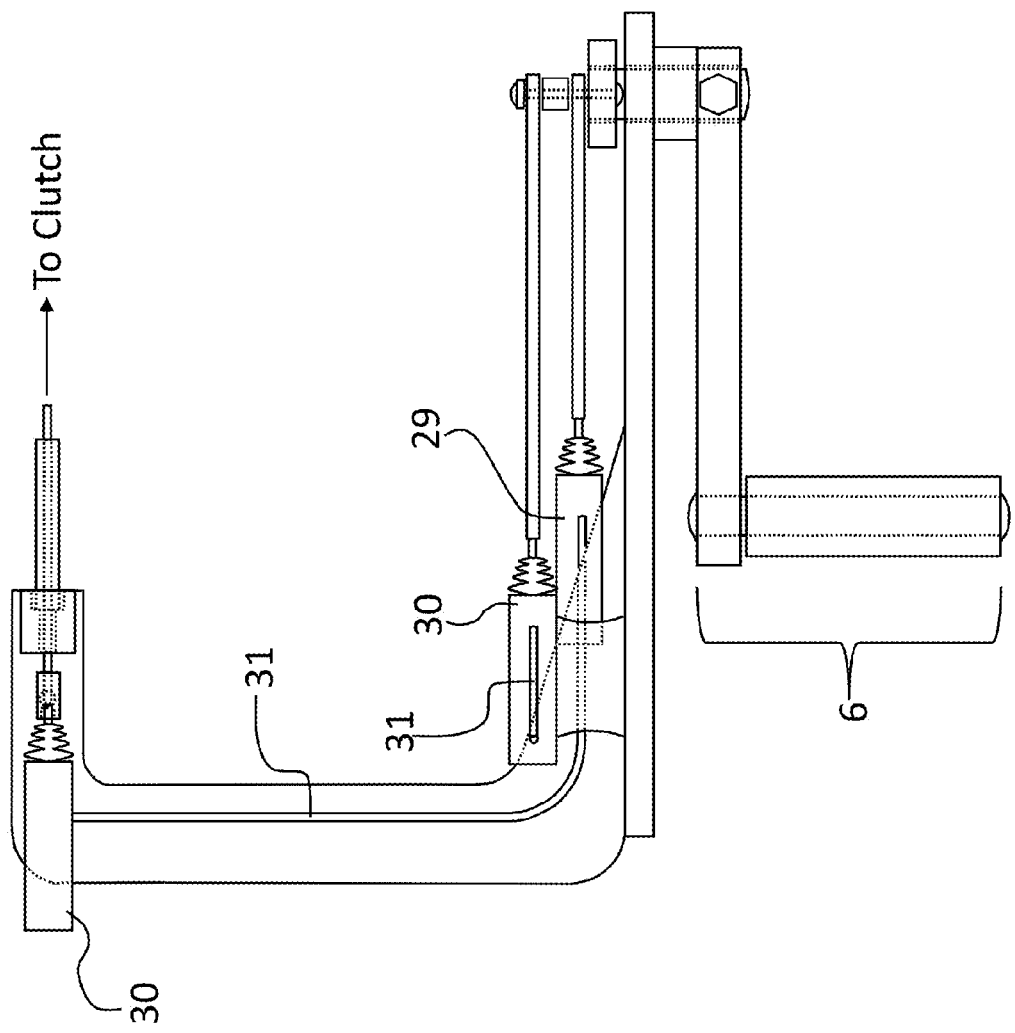
FIG. 9 is a top view of the embodiment of the invention described in FIG. 8 according to the present invention.

Hydraulic control linkage system [FIG. 8, FIG. 9]: In yet another embodiment of the present invention, a master cylinder 29 transmits the force of the foot clutch pedal 6 or the hand clutch lever 7 by pressurizing and flowing hydraulic fluid through tubular hydraulic lines 31. The flow and pressure of the hydraulic fluid redirects the force of the foot clutch pedal 6 or the hand clutch lever 7 to the appropriate area of the motorcycle to actuate a piston within slave cylinders 30 which move other elements of the clutch linkage. The force and displacement of pistons within the respective cylinders can be precisely tailored to the present invention by varying the comparative cross sectional area of the pistons.

Master Cylinder: For the hydraulic control linkage embodiment of the present invention, a master cylinder is a control device comprised of a small cylinder and piston that converts non-hydraulic force from the foot clutch pedal or the hand clutch lever into hydraulic pressure that transfers the force via hydraulic fluid through metal tubing to a slave cylinder. This results in displacement of a piston in the slave cylinder to actuate other elements of the clutch linkage.

Slave Cylinder: For the hydraulic control linkage embodiment of the present invention, a slave cylinder is small cylinder containing a piston which, when under hydraulic pressure from a master cylinder, the piston is displaced and in turn actuates other elements of the clutch linkage.

2. Best Mode of the Invention

Figure 3:
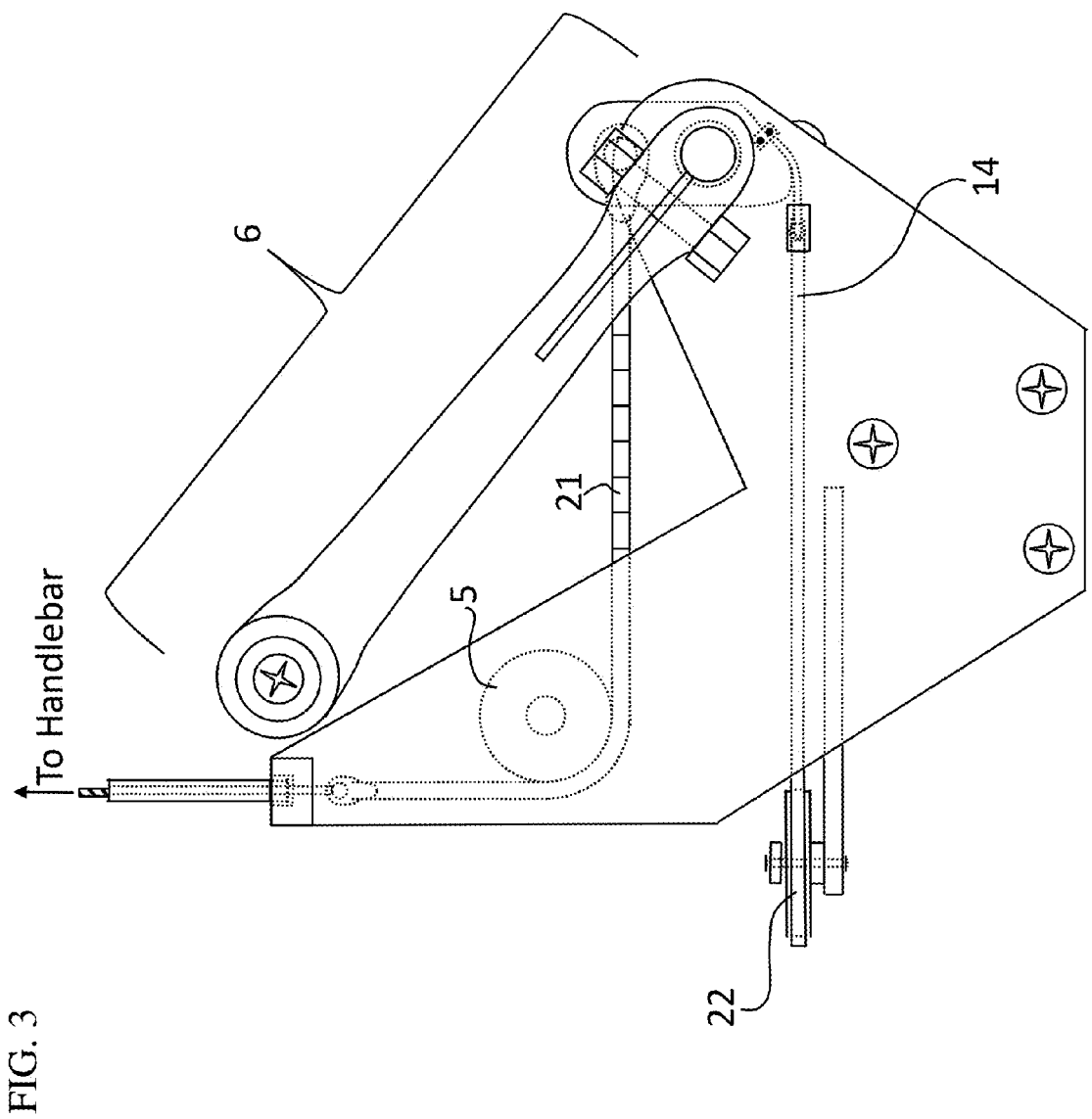
FIG. 3 is a left side view of the invention according to the present invention.
Figure 4:
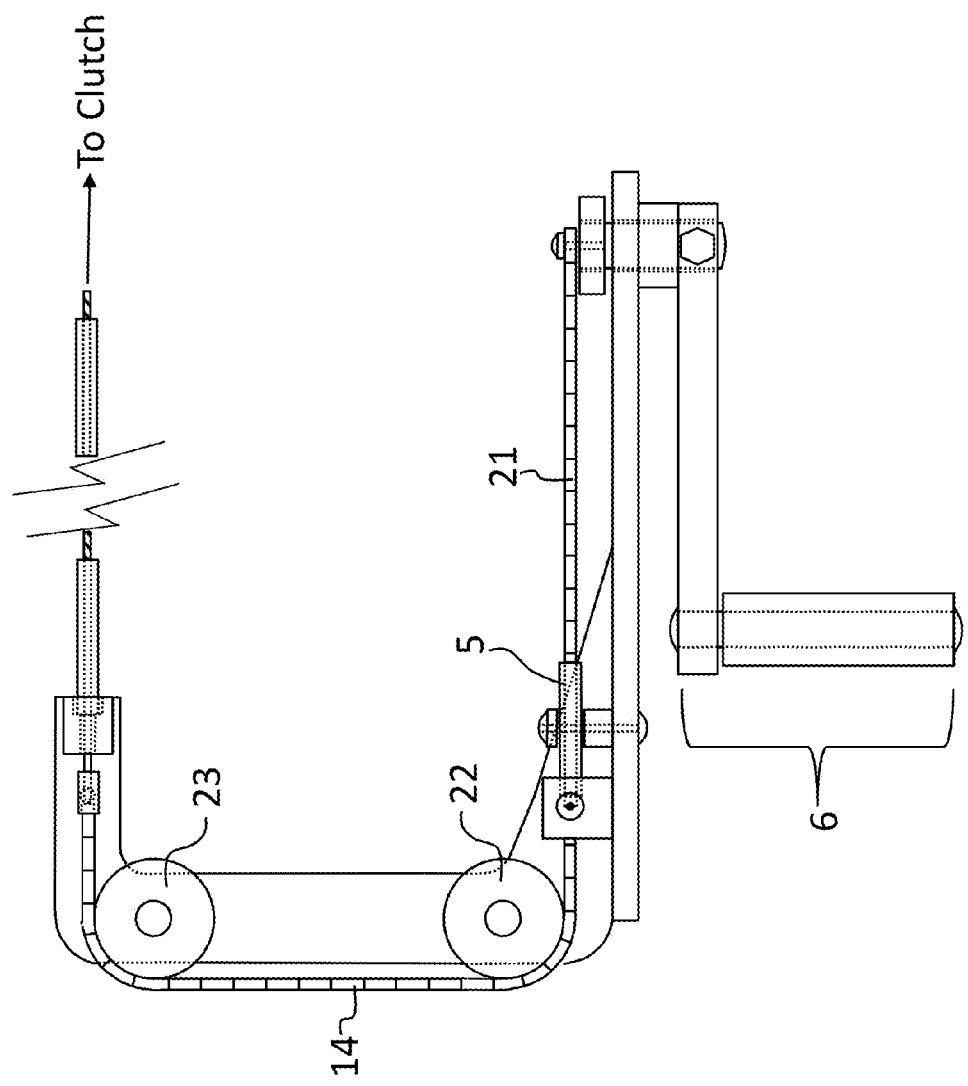
FIG. 4 is a top view of the invention according to the present invention.

FIG. 1, FIG. 3 and FIG. 4 show the side and top views, as well as a three dimensional view of the best mode contemplated by the inventor of the linked dual action motorcycle clutch actuator.

3. How to Make the Invention

The following will explain the means of making the invention, reflecting a version that uses the sprocket and sprocket chain control linkage system as the means to redirect the motive force and power from the foot clutch pedal or the hand clutch lever to clutch mechanism. All other embodiments of the invention can be made with the various analogous parts presented for this invention, and depicted in the illustrations. Other embodiments for this invention are configured to actuate a motorcycle clutch, regardless of which location on the motorcycle the clutch actuation force must originate or terminate. Still other embodiments of this invention can accomplish clutch actuation by employing a hybrid combination of different control linkages described in the definitions as well as control linkages enabled by emerging technologies such as wireless control, according to the present invention.

As can be amply seen from the drawings, particularly FIG. 1, of the linked dual action motorcycle clutch actuator, a vertical plate 1 is fastened to the left side of the motorcycle with bolts 2 or other appropriate means, to position the invention in the proper location on the motorcycle that would enable actuation with the left foot. To the vertical plate 1 is attached, by welding or other appropriate means, a horizontal plate 3 that extends around the front of the motorcycle and behind the front wheel, to the right side of the motorcycle. In addition, each plate contains the holes in the appropriate locations for mounting the respective sprockets 5, 22 and 23 that will redirect the force originating from the foot clutch pedal 6 or hand clutch lever 7. To each plate is also attached a cable housing stop 4 & 18 to hold and position the cable housings 16 as well as enabling the displacement of the cables 15 & 20 in reference to the cable housing 16. The foot clutch pedal shaft housing 8 is also integral to the vertical plate 1. The plates in this invention may be of steel, aluminum or other materials that would provide sufficient rigidity and strength. The plates may also be forgings or molded components taking the most appropriate form for any embodiment of this invention.

The foot clutch pedal shaft 9 is aligned and inserted into the foot clutch pedal shaft housing 8. With the foot clutch pedal shaft 9 inside the shaft housing 8, to the inboard (right) side of the foot clutch pedal shaft 9 is attached the 180 degree bell crank 10 with the cam 11 in the lower position. To the outboard (left) side of the foot clutch pedal shaft 9 is attached the foot clutch pedal lever 12. A torsion spring 13 or other appropriate device is installed in a manner that will provide additional force for augmenting the force imparted to the control linkage by the spring(s) in the original equipment manufacturer motorcycle clutch assembly, thereby more readily returning the clutch to the engaged position by rotating the foot clutch pedal 6 clockwise (from the left side perspective) upon the rider withdrawing positive pressure from the foot clutch pedal 6.

To the upper facing part of the 180 degree bell crank 10 is attached the sprocket chain 21, which in turn is linked to the control cable 15 that directs the force from the hand clutch lever 7 to the bell crank 10 via the sprocket chain 21. Below the cable housing stop 18 on the vertical plate 1, the sprocket chain 21 will be attached to the control cable 15 leading up to the left hand clutch lever 7. The pulling force from the hand clutch lever 7 is redirected to the 180 degree bell crank 10 as the sprocket chain 21 changes the direction of the force around the sprocket 5.

A sprocket chain 14, that redirects the force from the left side of the motorcycle, around the front of the motorcycle, and behind the front wheel, to the right side of the motorcycle, is attached to the cam 11 that is integrated into the lower facing end of the 180 degree bell crank 10. Before reaching the cable housing stop 4 on the right side of the horizontal plate 3, the sprocket chain 14 will then be attached to the control cable 20 leading to the final original equipment manufacturer clutch assembly which resides inside a housing on the right side of the motorcycle. The force from the foot clutch pedal 6 or the hand clutch lever 7 is redirected to the final original equipment manufacturer clutch assembly on the right side of the motorcycle as the sprocket chain 14 changes directions around the sprockets 22 & 23.

Each connection between cable 15 & 20 and sprocket chains 14 & 21 is accomplished with a cable-to-sprocket chain interface 17 & 22.

Figure 5:
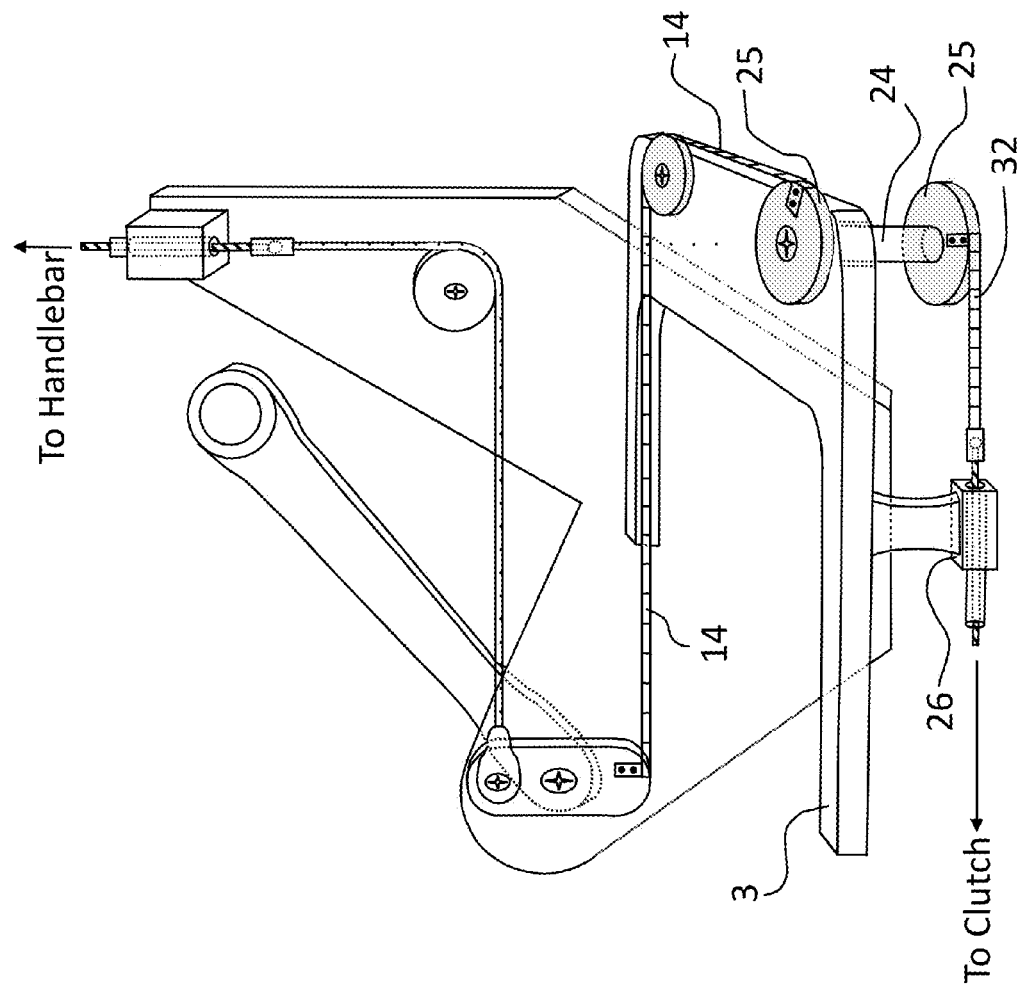
FIG. 5 is a three dimensional view of the right side of another embodiment of the invention depicting one method of redirecting the force of the foot clutch pedal or the hand clutch lever, with respect to positive or negative elevation change

FIG. 5 depicts a method that can be employed on the present invention for redirecting the force from the foot clutch pedal or the hand clutch lever with respect to a change in positive or negative vertical elevation in relation to the horizontal plate 3. Vertical shaft 24 is positioned vertically through the horizontal plate 3. To vertical shaft 24 are fitted horizontally oriented bell cranks 25 and 26 on the top and bottom of the shaft 24. Sprocket chains 14, 32 are attached to the upper and lower bell cranks to transfer the force from the foot clutch pedal 6 or the hand clutch lever 7 to the required elevation, above or below the horizontal plate 3, via torsional rotation of the vertical shaft 24. This assembly will be fitted through the right side portion of the horizontal plate 3 when it is necessary to route the control cable, terminating at the original equipment manufacturer clutch assembly, as straight and direct as possible.

After the installation of the present invention to a motorcycle, the tension of the various cables and chains may be adjusted with inline cable housing adjusters, or other methods, to enable proper tension of the control linkage.

4. How to Use the Invention

The problems remediated by the linked dual action motorcycle clutch actuator FIG. 1 become easily apparent by those skilled in this art. The linked dual action motorcycle clutch actuator FIG. 1 prevents motorcycle accidents for motorcycles with hand gear shift levers that have been retrofitted with this invention. The linked dual action motorcycle clutch actuator FIG. 1 prevents injury to the motorcycle operator and passenger. The linked dual action motorcycle clutch actuator FIG. 1 saves the lives of the motorcycle operator and passenger. The linked dual action motorcycle clutch actuator FIG. 1 prevents injury to pedestrians and bystanders. The linked dual action motorcycle clutch actuator FIG. 1 saves the lives of pedestrians and bystanders. The linked dual action motorcycle clutch actuator FIG. 1 prevents damage to the motorcycle that has been retrofitted with this invention. The linked dual action motorcycle clutch actuator FIG. 1 prevents damage to other motorcycles, automobiles, and property. The linked dual action motorcycle clutch actuator FIG. 1 prevents injury to passengers in other automobiles. The linked dual action motorcycle clutch actuator FIG. 1 saves the lives of passengers in other automobiles. The linked dual action motorcycle clutch actuator FIG. 1 reduces danger by preventing the motorcycle from stalling in the middle of traffic. The linked dual action motorcycle clutch actuator FIG. 1 reduces danger by preventing uncontrolled surging of the motorcycle into to other motorcycles, automobiles, property, pedestrians and bystanders. The linked dual action motorcycle clutch actuator FIG. 1 reduces danger to other motorcycles, automobiles, property pedestrians and bystanders by preventing the motorcycle from falling over during slow speed maneuvers. The linked dual action motorcycle clutch actuator FIG. 1 reduces danger to other motorcycles, automobiles, property, pedestrians and bystanders by enabling sudden emergency stops from high speed while the motorcycle is in gear with the engine running. The linked dual action motorcycle clutch actuator FIG. 1 allows less initiated motorcycle riders to engage in riding and enjoying modern motorcycles resembling vintage motorcycles. The linked dual action motorcycle clutch actuator FIG. 1 allows disabled motorcycle riders on three wheeled motorcycles (trikes) and motorcycles equipped with a side car, to enjoy the sport of motorcycling. The linked dual action motorcycle clutch actuator FIG. 1 provides the means to accomplish precise clutch control of the motorcycle equipped with a hand gear shift lever.

The linked dual action motorcycle clutch actuator FIG. 1 will find wide spread use within the custom motorcycle parts industry, custom motorcycle manufacturing industry, among individual custom motorcycle builders/enthusiasts, and among disabled motorcycle riders. The linked dual action motorcycle clutch actuator FIG. 1 will be capable of being installed by one individual with minimal mechanical skills Much time, labor and expense will be saved by preventing frequent replacement of damaged and frayed clutch control cables. Much time, labor and expense will be saved by preventing accidents. The savings in collision and liability insurance claims and premiums would be considerable. Private industry would employ many workers to manufacture, distribute, sell and install many units.

What is claimed is:

1. A linked dual action motorcycle clutch actuator on a motorcycle, having an engine and a clutch, comprising: a vertical first plate mounted to the motorcycle and a "U" shaped second plate mounted to the first plate and extended in front of the engine from one side of the motorcycle to the other side of the motorcycle; including a first force transmitting structure that has a first end connected to a hand lever and a second end connected to a first end of a bell crank mounted on the first plate; and including a second force transmitting structure that has a first end connected to a second end of the bell crank and a second end connected to the clutch; a foot lever that is connected to a center pivot of the bell crank whereby either the hand lever or the foot lever can pivot the bell crank to actuate the clutch.

2. A linked dual action motorcycle clutch actuator according to claim 1 wherein the first force transmitting structure is a hollow tube filled with hydraulic fluid that has a master cylinder at the first end and a slave cylinder at the second end.

3. A linked dual action motorcycle clutch actuator according to claim 1 wherein the second force transmitting structure is a hollow tube filled with hydraulic fluid that has a master cylinder at the first end and a slave cylinder at the second end.

4. A linked dual action motorcycle clutch actuator according to claim 1 wherein the second force transmitting structure is a cable, belt or chain.

5. A linked dual action motorcycle clutch actuator according to claim 1 wherein the second force transmitting structure is a series of rods and additional bell cranks wherein the additional bell cranks are attached to the "U" shaped second plate; the rods and additional bell cranks transmit the force along the "U" shaped plate.

6. A linked dual action motorcycle clutch actuator according to claim 1 wherein the second force transmitting structure has the first end connected to the second end of the bell crank and the second end connected to a second bell crank which is connected to the first end of a vertical shaft; the vertical shaft having a pivot on the "U" shaped second plate; the vertical shaft having a third bell crank connected to the second end of the vertical shaft spaced from the "U" shaped second plate and wherein a third force transmitting structure comprising a cable, belt or chain that has a first end connected to the third bell crank and a second end connected to the clutch.

7. A linked dual action motorcycle clutch actuator according to claim 1 wherein the first force transmitting structure is a cable, belt or chain.

\* \* \* \* \*